H. S. CORBITT.
PROPELLING MECHANISM FOR BICYCLES AND THE LIKE.
APPLICATION FILED SEPT. 12, 1911.
1,015,996.
Patented Jan. 30, 1912.
3 SHEETS—SHEET 1.
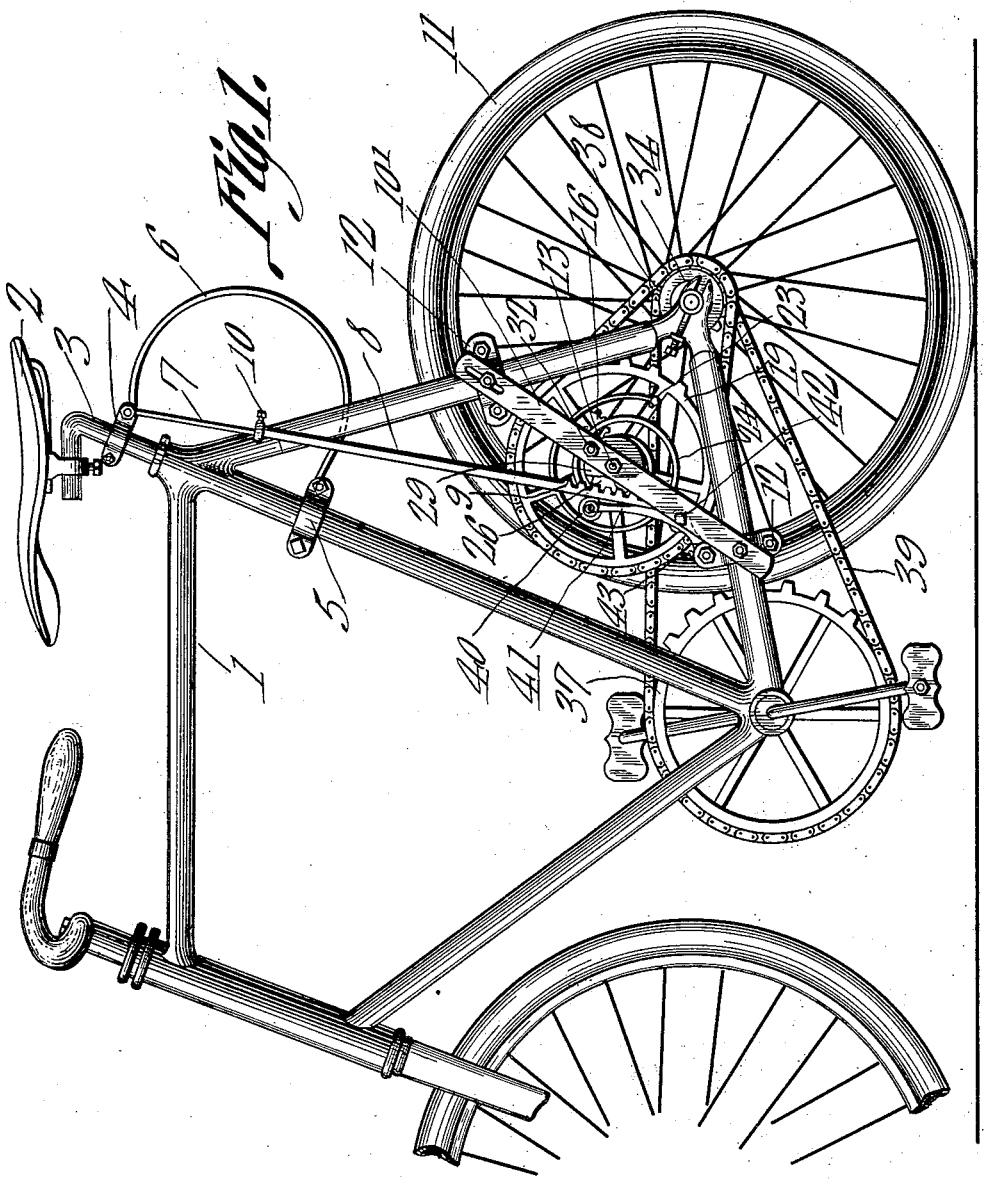
Witnesses
H. S. Corbitt, Inventor
by
Attorneys H. S. CORBITT.
PROPELLING MECHANISM FOR BICYCLES AND THE LIKE.
APPLICATION FILED SEPT. 12, 1911.
1,015,996.
Patented Jan. 30, 1912.
3 SHEETS—SHEET 2.
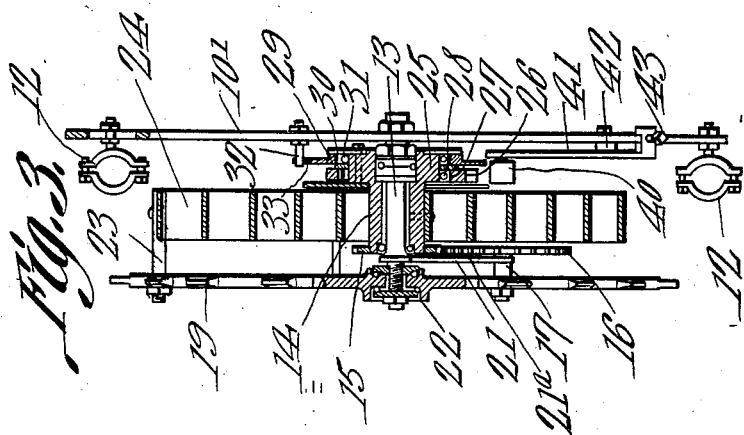
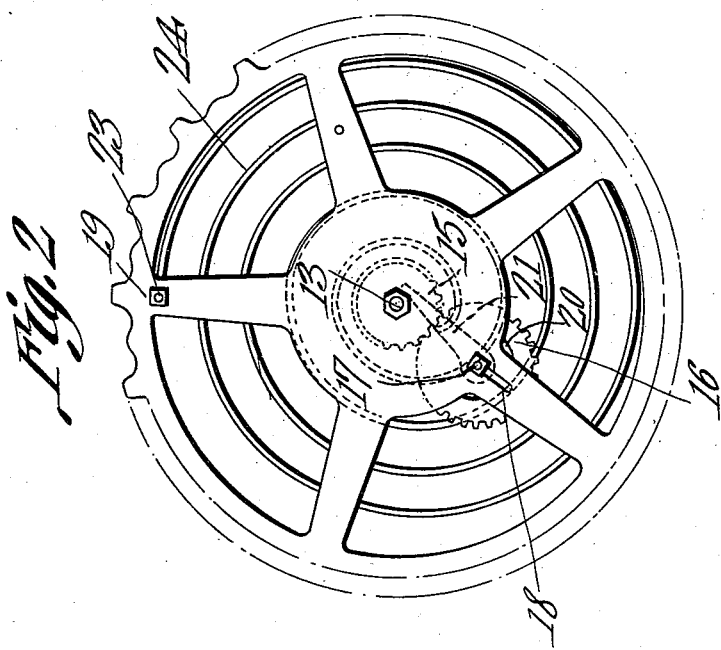
Witnesses
H. S. Corbitt,
Inventor
by C. A. Snow & Co.
Attorneys H. S. CORBITT.
PROPELLING MECHANISM FOR BICYCLES AND THE LIKE.
APPLICATION FILED SEPT. 12, 1911.
1,015,996.
Patented Jan. 30, 1912.
3 SHEETS—SHEET 3.
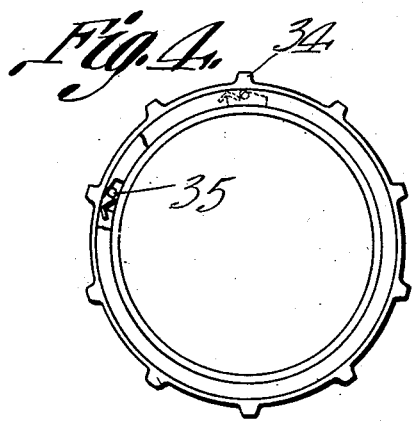
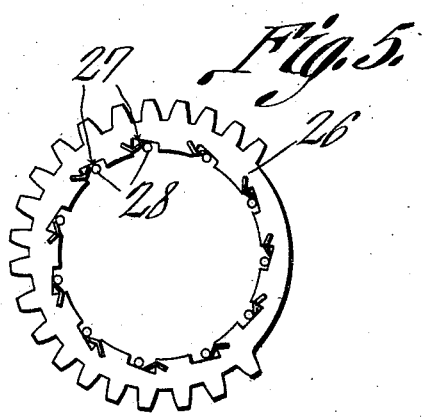
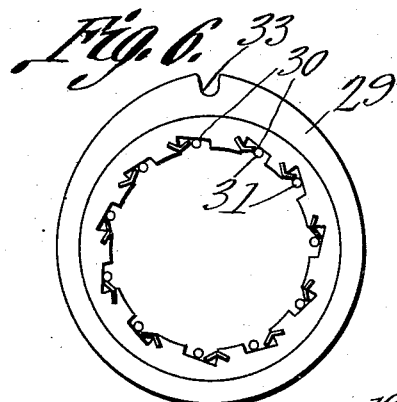
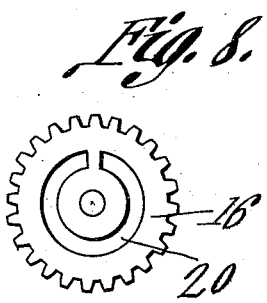
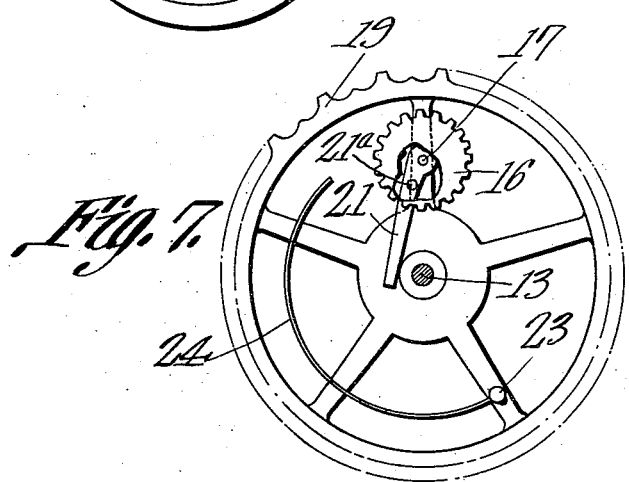
Witnesses
H. S. Corbitt,
Inventor
by C. A. Snow & Co.,
Attorneys

UNITED STATES PATENT OFFICE.

HEBBER S. CORBITT, OF NORFOLK, VIRGINIA.

PROPELLING MECHANISM FOR BICYCLES AND THE LIKE.

1,015,996.      Specification of Letters Patent.      Patented Jan. 30, 1912.

Application filed September 12, 1911. Serial No. 648,963.

*To all whom it may concern:*

Be it known that I, HEBBER S. CORBITT, a citizen of the United States, residing at Norfolk, in the county of Norfolk and State of Virginia, have invented a new and useful Propelling Mechanism for Bicycles and the Like, of which the following is a specification.

This invention relates to propelling mechanism for bicycles and the like and one of its objects is to provide mechanism of this character which can be readily applied to an ordinary form of bicycle and which utilizes, as a propelling force the pressure exerted on the saddle as the rider is operating the machine.

A further object is to provide power storing means operated by the saddle and which is adapted to materially assist in propelling the vehicle.

A further object is to provide mechanism of this type which can be quickly placed upon the frame of the bicycle or the like and which, when thus positioned, will not detract from the appearance of the machine or occupy an undesirable space.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings: Figure 1 is a side elevation of a bicycle having the present improvements applied thereto. Fig. 2 is a side elevation of the main sprocket of the attachment, showing the power storing spring, and the adjustable stop combined therewith, portions of said mechanism being shown by dotted lines. Fig. 3 is a central transverse section through the mechanism, the operating rod and the saddle connected thereto, being removed. Fig. 4 is a view partly in side elevation and partly in section of the secondary sprocket of the attachment. Fig. 5 is a side elevation of the combined clutch and gear adapted to be actuated by the rack bar. Fig. 6 is a side elevation of the other clutch member of the mechanism. Fig. 7 is a transverse section through the non-rotatable shaft and showing the main sprocket, the stop and its releasing means in elevation. Fig. 8 is an elevation of one side of the stop shifting gear.

Referring to the figures by characters of reference, 1 designates the frame of a bicycle or the like and the saddle 2 is mounted on a post 3 which is slidably mounted within the frame. A split sleeve 4 is secured to the upper portion of the saddle post and another split sleeve 5 is adjustably secured to the frame 1 below the post, the two sleeves being connected by a spring 6 which serves to hold the saddle 2 normally elevated. This spring is of sufficient strength to yieldingly support the rider so as to act as a cushion.

A rod 7 is pivotally connected to the upper sleeve 4 and telescopes into a tubular member 8 having a rack bar 9 at one end thereof, there being a set screw 10 or the like for holding the rod 7 against movement within the member 8. The power storing mechanism includes a base strip 10' adapted to be placed diagonally across the rear portion of the frame 1 and at one side of the rear wheel 11 of the bicycle, the ends of this base strip 10' being adjustably attached to the frame 1 by clips 12 of any desired form. A shaft 13 is secured to the base strip 10' at a point between the ends thereof and is held against rotation in any suitable manner, this shaft extending inwardly from the strip 10' and perpendicularly thereto. A barrel 14 is mounted for rotation on the shaft 13 and is provided, at one end, with a gear 15. This gear is in constant mesh with another gear 16 journaled on a stud 17 which is adjustably mounted within a radial slot 18 formed within the main or drive sprocket 19 of the attachment. An arcuate groove 20 is formed in one face of gear 16 and receives a stud 21ᵃ formed on a stop finger 21 pivotally mounted on stud 17. This pawl normally bears on the shaft 13.

A post 23 extends from the inner face of the sprocket 19 and is secured to one end of a coiled spring 24, the other end of this spring being secured to the barrel 14.

One end of the barrel 14 is formed with an annular enlargement or collar 25 and mounted on this collar is a ring gear 26 constantly in mesh with the rack bar 9. Ring 26 has a plurality of sockets 27 in which clutch balls 28 are movably mounted and adapted to bear on collar 25. The walls of the sockets 27 are so formed as to clamp the balls 28 upon the collar 25 when the ring is rotated by the downward movement of the rack 9 and to thus cause the barrel 14 to rotate with the gear. When, however, the gear 26 is rotated in the opposite direction by the rack 9 during its upward movement, the said gear will be free to rotate upon the collar 25 without rotating the barrel 14. Another ring 29 is loosely mounted on the collar 25 and has sockets 30 therein in which clutch balls 31 are loosely mounted. The walls of the sockets are so shaped as to clamp the balls upon the collar 25 when the barrel 14 is rotated clockwise, thus constituting an efficient clutch for preventing such movement of the barrel without, however, preventing counter-clockwise movement of the barrel. It is to be understood that the construction of the ball clutches can be of any suitable type, it merely being desirable to utilize a clutch for preventing clockwise movement of the barrel, and another clutch for transmitting motion to the barrel so as to rotate it in a counter-clockwise direction. The ring 29 is held against rotation by a locking stud 32 or the like projecting from the base strip 10' and into a notch 33 formed in the periphery of the ring 29.

A sprocket ring 34 is carried by the hub of the rear wheel 11 of the bicycle and is provided with a ball clutch, such as indicated at 35 whereby, when the sprocket ring is rotated counter-clockwise the wheel 11 will be moved therewith, said wheel being free to rotate in the same direction while the sprocket ring 34 is held stationary. A chain 36 is used for transmitting motion from the main sprocket 19 to the sprocket ring 34.

It is to be understood that the bicycle is to be provided with the ordinary propelling mechanism such as a front sprocket 37, a rear sprocket 38, and a drive chain 39.

The rack 9 is held in mesh with the gear 26 by a guide roller 40 carried by one end of a lever 41 which is fulcrumed, as at 42, upon the base strip 10'. The other end of the lever has an adjusting screw 43 bearing against the base strip 10' and by means of which the roller 40 can be moved toward or away from the rack 9.

It is understood that under ordinary conditions the spring 6 supports the saddle 2 in its elevated position and the rack 9 is thus held with its lower end portion in mesh with the gear 26. Stop finger 21 is normally in engagement with the shaft 13 and the stud 21$^a$ is contacted by one end wall of groove 20, thus limiting the rotation of gear 16 and, consequently, the unwinding of the spring. When the saddle post 3 is shifted downwardly as, for example, when the machine is jolted while passing over an obstruction, the rack 9 will be pushed downwardly and cause the ring gear 26 to rotate. The clutch within this ring will grip the collar 25 and rotate barrel 14 so that the gear 15 will rotate the larger gear 16. The arrangement of groove 20 and stud 21$^a$ is such as to permit almost two complete revolutions of gear 16 before stopped by the finger 21 moving against the shaft 13. Spring 24 is thus wound by the downward movement of the saddle, the sprocket 19 being held against clockwise movement by the clutch in sprocket ring 34 and by the chain 36. As soon as the saddle moves upwardly and the rack bar shifts back to its normal position, the spring 24 unwinds and its inner end is secured to barrel 14 and said barrel is held by the clutch ring 29. It will thus be apparent that the sprocket wheel 19 will be rotated upon the shaft 13. Chain 36 will, therefore, drive the sprocket ring 34 so as to cause its clutch members to engage the hub of wheel 11 and drive said wheel forward. This action of the spring will, obviously, materially assist the operator in propelling the machine forward. It will be seen that the action of the unwinding of the spring 24 is limited by finger 21 moving against shaft 13. By adjusting stud 17, gear 16 can be disengaged from gear 15 and the spring 24 then wound or unwound so that it can be normally held at any desired tension. The spring can thus be adjusted for use by persons of different weights. By adjusting sleeve 5 the tension of spring 6 can also be varied.

It is designed to provide the various working parts of the structure with ball bearings so that they will all work freely.

Importance is attached to the fact that the mechanism constituting the present invention constitutes merely an attachment for a bicycle and can be readily applied without making any changes in the bicycle structure.

What is claimed is:—

1. A driving attachment for bicycles and the like comprising a power spring, saddle operated means for winding the spring, means for holding said spring at a predetermined tension, a driving element adapted to be operated by the spring when wound above its normal tension, and means for holding said element against rotation during the winding operation.

2. A driving attachment for bicycles and the like comprising a power spring, saddle operated means for winding the spring, adjustable means for holding the spring normally at any predetermined tension, a driving element adapted to be operated by the spring when wound to more than its normal tension, and means for holding said element against rotation during the winding operation.

3. A propelling attachment for bicycles and the like, comprising a base, means for attaching the same to a bicycle frame, a power spring, means operated by the movement of the bicycle seat in one direction relative to the frame, for winding the spring, means for maintaining the spring normally at a predetermined tension, a driving element adapted to be operated by the spring after being wound to more than its normal tension, and means for holding said element against rotation during the winding operation.

4. A propelling attachment for bicycles and the like, comprising a nonrotatable shaft, means for securing the same to the frame of a bicycle, a barrel mounted for rotation upon the shaft, a power spring connected at one end to the barrel, a driving element mounted for rotation upon the shaft and connected to the other end of the spring, means for holding said element against rotation in one direction upon the shaft, means operated by the movement of the saddle in one direction for rotating the barrel to wind the spring, means cooperating with the barrel for holding the same against rotation in one direction, said spring constituting means for rotating the driving element subsequent to the winding of the spring to more than a predetermined tension.

5. A propelling attachment for bicycles and the like, comprising a nonrotatable shaft, means for adjustably and detachably connecting it to the frame of a bicycle, a revoluble drive element mounted on the shaft, means for holding said element against rotation in one direction upon the shaft, a power spring connected at one end to said element, a barrel mounted for rotation on the shaft and connected to the other end of the spring, a spring supported saddle post mounted for reciprocation, a gear mounted for rotation upon the barrel in one direction and with the barrel in the opposite direction, a rack engaging the gear, a connection between the rack and saddle post, and means for holding the spring normally at a predetermined tension prior to the winding thereof.

6. A propelling attachment for bicycles and the like, comprising a nonrotatable shaft, a revoluble driving element supported by the shaft, means for holding said element against rotation in one direction, a power spring connected at one end to said element, a barrel mounted for rotation upon the shaft and connected to the other end of the spring, a gear journaled upon said element, means for transmitting motion thereto from the barrel, means controlled by said gear for holding the spring normally at a predetermined tension, and means operated by the movement of the bicycle saddle in one direction for rotating the barrel to wind the spring, and for shifting said holding means out of normal position.

In testimony that I claim the foregoing as my own, I have hereto affixed my signature in the presence of two witnesses.

HEBBER S. CORBITT.

Witnesses:
 FRANK B. OCHSENREITER,
 A. C. BURKE.

---

Copies of this patent may be obtained for five cents each, by addressing the "Commissioner of Patents, Washington, D. C."